US012483991B2

(12) United States Patent
Selvaganapathy et al.

(10) Patent No.: US 12,483,991 B2
(45) Date of Patent: Nov. 25, 2025

(54) PI/2-BPSK FOR INITIAL ACCESS

(71) Applicant: Nokia Technologies Oy, Espoo (FI)

(72) Inventors: Srinivasan Selvaganapathy, Bangalore (IN); Karri Markus Ranta-Aho, Espoo (FI)

(73) Assignee: Nokia Technologies Oy, Espoo (FI)

( * ) Notice: Subject to any disclaimer, the term of this patent is extended or adjusted under 35 U.S.C. 154(b) by 382 days.

(21) Appl. No.: 18/040,288

(22) PCT Filed: Jul. 15, 2021

(86) PCT No.: PCT/EP2021/069847
§ 371 (c)(1),
(2) Date: Feb. 2, 2023

(87) PCT Pub. No.: WO2022/033801
PCT Pub. Date: Feb. 17, 2022

(65) Prior Publication Data
US 2024/0389030 A1    Nov. 21, 2024

(30) Foreign Application Priority Data
Aug. 11, 2020  (IN) .............................. 202041034463

(51) Int. Cl.
*H04W 52/14*    (2009.01)
*H04L 5/00*    (2006.01)
(Continued)

(52) U.S. Cl.
CPC ......... *H04W 52/146* (2013.01); *H04L 5/0053* (2013.01); *H04L 27/18* (2013.01);
(Continued)

(58) Field of Classification Search
CPC ..... H04W 52/14; H04W 52/50; H04W 74/00; H04W 74/08; H04W 72/04; H04W 72/10;
(Continued)

(56) References Cited
U.S. PATENT DOCUMENTS 10,924,252 B2 * 2/2021 Yang .................... H04J 13/0029
10,931,492 B2 * 2/2021 Vos ..................... H04L 27/2636
(Continued)

FOREIGN PATENT DOCUMENTS

CN    109600200 A    4/2019
CN    111096045 A    5/2020
(Continued)

OTHER PUBLICATIONS

Office action received for corresponding Indian Patent Application No. 202347014999, dated Jul. 19, 2023, 6 pages.
(Continued)

*Primary Examiner* — Man U Phan
(74) *Attorney, Agent, or Firm* — Lippes Mathias LLP

(57) ABSTRACT

Methods and apparatus, including computer program products, are provided for pi/2 BPSK initial access. In some example embodiments, there may be provided a method that includes receiving, at a user equipment, information indicating network support of an initial network access based on a pi/2 binary phase shift keying (pi/2-BPSK) modulation and coding scheme; and performing, in response to the received system information, the initial network access by at least
(Continued)

sending a connection request based on the pi/2-BPSK modulation and coding scheme. Related systems, methods, and articles of manufacture are also described.

18 Claims, 6 Drawing Sheets

(51) Int. Cl.
  *H04L 27/18* (2006.01)
  *H04L 27/26* (2006.01)
  *H04W 52/50* (2009.01)
  *H04W 74/0833* (2024.01)
(52) U.S. Cl.
  CPC ............ *H04L 27/261* (2013.01); *H04W 52/50* (2013.01); *H04W 74/0833* (2013.01)
(58) Field of Classification Search
  CPC ..... H04W 72/21; H04W 72/12; H04W 72/23; H04W 52/02; H04W 52/18; H04W 52/26; H04W 52/30; H04W 52/36; H04W 76/00; H04W 76/10; H04W 76/12; H04W 76/28; H04L 5/00; H04L 27/18; H04L 27/26; H04L 27/20; H04L 1/00
  USPC ............................................................ 370/311
  See application file for complete search history.

(56) References Cited

U.S. PATENT DOCUMENTS

| | | | | |
|---|---|---|---|---|
| 11,196,597 | B2* | 12/2021 | Yang | H04L 5/10 |
| 11,239,966 | B2* | 2/2022 | Yang | H04L 27/18 |
| 11,343,040 | B2* | 5/2022 | Noh | H04L 27/2614 |
| 11,349,693 | B2* | 5/2022 | Zhao | H04L 5/0044 |
| 11,817,947 | B2* | 11/2023 | Baldemair | H04L 5/1453 |
| 11,974,324 | B2* | 4/2024 | Hu | H04W 74/0836 |
| 12,021,676 | B2* | 6/2024 | Noh | H04L 27/2613 |
| 12,048,004 | B2* | 7/2024 | Matsumura | H04W 72/21 |
| 2017/0041900 | A1 | 2/2017 | Wallentin et al. | |
| 2020/0014569 | A1* | 1/2020 | Huang | H04W 8/24 |
| 2023/0085404 | A1* | 3/2023 | Park | H04W 52/367 |
| | | | | 455/522 |
| 2023/0140970 | A1* | 5/2023 | Lin | H04L 1/189 |
| | | | | 370/329 |

FOREIGN PATENT DOCUMENTS

| | | |
|---|---|---|
| JP | 2009-088980 A | 4/2009 |
| JP | 2011-061456 A | 3/2011 |
| WO | 2019/157671 A1 | 8/2019 |
| WO | 2019/158017 A1 | 8/2019 |
| WO | 2020/059097 A1 | 3/2020 |
| WO | 2020/143058 A1 | 7/2020 |
| WO | 2020/157966 A1 | 8/2020 |

OTHER PUBLICATIONS

Office Action received for corresponding Japanese Patent Application No. 2023-515715, dated Jun. 27, 2024, 5 pages of Office Action and 10 pages of summary and translation available.

"Multiple POs for Paging in NR-U", 3GPP TSG-RAN2 105, R2-1900135, Agenda item: 11.2.2.1, Samsung, Feb. 25-Mar. 1, 2019, 3 pages.

Decision of Final Rejection received for corresponding Japanese Patent Application No. 2023-510407, dated Oct. 7, 2024, 1 page of Decision of Final Rejection and 5 pages of translation/summary available.

Office action received for corresponding Japanese Patent Application No. 2023-510407, dated Mar. 7, 2024, 3 pages of office action and 8 pages of translation/summary available.

Office action received for corresponding European Patent Application No. 21746418.9, dated Jul. 29, 2024, 7 pages.

"3rd Generation Partnership Project; Technical Specification Group Radio Access Network; NR; Physical layer procedures for control (Release 16)", 3GPP TS 38.213, V16.1.0, Mar. 2020, pp. 1-156.

"3rd Generation Partnership Project; Technical Specification Group Radio Access Network; NR; Physical layer procedures for data (Release 16)", 3GPP TS 38.214, V16.1.0, Mar. 2020, pp. 1-151.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NR; User Equipment (UE) radio transmission and reception; Part 1: Range 1 Standalone (Release 16)", 3GPP TS 38.101-1, V16.3.0, Mar. 2020, pp. 1-332.

"IEEE 802.11", Wikipedia, Retrieved on Mar. 1, 2023, Webpage available at : https://en.wikipedia.org/wiki/IEEE_802.11.

"IEEE 802.16", Wikipedia, Retrieved on Mar. 1, 2023, Webpage available at : https://en.wikipedia.org/wiki/IEEE_802.16.

"IEEE 802.3", Wikipedia, Retrieved on Mar. 1, 2023, Webpage available at : https://en.wikipedia.org/wiki/IEEE_802.3.

"IEEE 802.15", Wikipedia, Retrieved on Mar. 1, 2023, Webpage available at : https://en.wikipedia.org/wiki/IEEE_802.15.

International Search Report and Written Opinion received for corresponding Patent Cooperation Treaty Application No. PCT/EP2021/069847, dated Oct. 27, 2021, 17 pages.

"Lower PAPR reference signals", 3GPP TSG-RAN WG1 Meeting #96, R1-1903468, Agenda: 7.2.8.5, Qualcomm Incorporated, Feb. 25-Mar. 1, 2019, 24 pages.

"Coverage enhancement for Msg3", 3GPP TSG RAN WG1 Meeting #103-e, R1-2007906, Agenda: 8.8.2.3, IITH, Oct. 26-Nov. 13, 2020, 2 pages.

Office action received for corresponding Chinese Patent Application No. 202180063998.8, dated May 1, 2025, 8 pages of office action and 6 pages of translation available.

\* cited by examiner

PI/2-BPSK FOR INITIAL ACCESS

RELATED APPLICATION

This application was originally filed as PCT Application No. PCT/EP2021/069847, filed on Jul. 15, 2021, which claims priority from IN application No. 202041034463, filed on Aug. 11, 2020, each of which is incorporated herein by reference in its entirety.

FIELD

The subject matter described herein relates to cellular systems and, in particular, initial access.

BACKGROUND

In 3GPP, New Radio (NR) provides pi/2 binary phase shift keying (x/2-BPSK) in the uplink (UL) path as the lowest order (e.g., least bits per symbol) digital modulation in a set of digital modulations for the uplink data transmission. The pi/2-BPSK can be generated from the standard BPSK signal by multiplying the symbol sequence with a rotating phasor with phase increments per symbol period of pi/2. This pi/2-BPSK can have the same bit error rate performance as BPSK over a linear channel, but pi/2-BPSK can exhibit less envelope variation.

SUMMARY

Methods and apparatus, including computer program products, are provided for pi/2 BPSK initial access.

In some example embodiments, there may be provided a method that includes receiving, at a user equipment, information indicating network support of an initial network access based on a pi/2 binary phase shift keying (pi/2-BPSK) modulation and coding scheme; and performing, in response to the received system information, the initial network access by at least sending a connection request based on the pi/2-BPSK modulation and coding scheme.

In some variations, one or more of the features disclosed herein including the following features can optionally be included in any feasible combination. The information may be received as system information transmitted before a physical random access channel (PRACH) preamble is sent by the user equipment. The information may be received from the network as a random access response including an uplink grant from a base station. The received information may further indicate network support for a pi/2-BPSK demodulation reference signal. The connection request may include a radio resource control connection request message sent, via a physical uplink shared channel, based on the pi/2-BPSK modulation and coding scheme and a demodulation reference signal. The demodulation reference signal may include a pi/2-BPSK demodulation reference or a Zadoff-Chu DMRS demodulation reference signal. A physical random access channel (PRACH) preamble may be sent indicative of the user equipment support of the pi/2-BPSK modulation and coding scheme and/or a pi/2-BPSK demodulation reference signal. The received information may further indicate one or more of the following: whether power boosting is used for performing a random access channel access using the pi/2-BPSK modulation and coding scheme and/or the pi/2-BPSK demodulation reference signal; whether power boosting is used for the initial network access or a re-transmission; whether power boosting is used for hybrid automatic repeat request retransmission; or one or more modulation and coding scheme indexes eligible for pi/2 BPSK transmission.

In some example embodiments, there may be provided a method that includes sending, to a user equipment, information indicating network support of an initial network access based on a pi/2 binary phase shift keying (pi/2-BPSK) modulation and coding scheme; receiving, via a physical uplink shared channel, the initial network access comprising a connection request from the user equipment; and detecting the connection request is transmitted using the pi/2-BPSK modulation and coding.

In some variations, one or more of the features disclosed herein including the following features can optionally be included in any feasible combination. The connection request may be responded to with connection set up information, in response to the detecting. The information may be sent as at least one of the following: system information transmitted before a physical random access channel (PRACH) preamble is sent by the user equipment or a random access response including an uplink grant from the base station. The connection request may include a radio resource control connection request message carried, via a physical uplink shared channel, using the pi/2-BPSK modulation and coding scheme and a demodulation reference signal. The demodulation reference signal may include a pi/2-BPSK demodulation reference signal or a Zadoff-Chu DMRS demodulation reference signal sequence. The information indicating the network support may further indicate support for the pi/2-BPSK demodulation reference signal. A physical random access channel (PRACH) may be received preamble indicative of the user equipment support of the pi/2-BPSK modulation and coding scheme and/or the pi/2-BPSK demodulation reference signal. The information that is sent may further indicate one or more of the following: whether power boosting is used for performing a random access channel access using the pi/2-BPSK modulation and coding scheme and/or the pi/2-BPSK demodulation reference signal; whether power boosting is used for the initial network access or a re-transmission; whether power boosting is used for hybrid automatic repeat request retransmission; or one or more modulation and coding scheme indexes eligible for pi/2 BPSK transmission. The detecting may further include detecting the connection request is transmitted using a pi/2-BPSK modulation and coding scheme based on at least one of a correlation a demodulation reference signal sequence indicative of the pi/2-BPSK modulation and coding scheme or a cyclic redundancy check of the demodulation reference signal sequence. In response to a failure of the cyclic redundancy check, an assignment of an uplink grant including a downlink control information format for a retransmission using a new radio network temporary identifier for a pi/2-BPSK based retransmission may be sent to the user equipment.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1A:
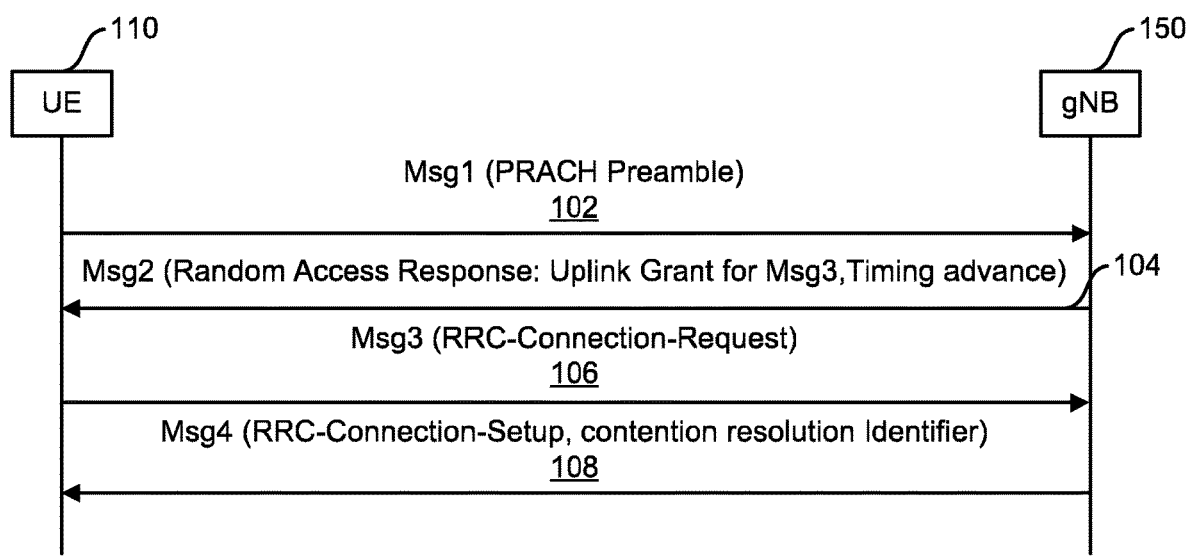
FIG. 1A depicts an example of an initial access procedure to a network, in accordance with some example embodiments.

Like labels are used to refer to same or similar items in the drawings.

DETAILED DESCRIPTION

The NR system (also referred to as the 5G system) may, as noted, provide support for the pi/2-BPSK modulation and coding scheme (MCS), but pi/2-BPSK MCS is an optional feature for a user equipment (UE), so not all UEs may choose to support pi/2-BPSK. The UE may optionally support spectrum shaping when using this pi/2-BPSK MCS for improved peak-to-average power ratio performance (PAPR) and correspondingly smaller maximum power reduction (MPR) values and even higher average transmit power levels. Furthermore, nominal 3 dB power boosting (reference power of 26 dBm rather than the typical 23 dBm for power class 3 UEs, as indicated in Note 1 of the table 1 below) can also be supported by the UE, when using pi/2-BPSK. When this is the case, the spectrum flatness requirements are somewhat relaxed and the maximum power reduction values are somewhat larger. This can reduce the actual power difference to up to about 2.8 dB in the inner resource blocks (RBs) while on the band edge the power difference is non-existent. Table 1 below (which is reproduced from 3GPP TS 38.101-1) depicts the MPR for power class 3 of pi/2-BPSK compared to other modulation and coding schemes.

TABLE 1

| | | MPR (dB) | | |
|---|---|---|---|---|
| Modulation | | Edge RB allocations | Outer RB allocations | Inner RB allocations |
| DFT-s-OFDM | Pi/2 BPSK | ≤3.5[1] ≤0.5[2] | ≤1.2[1] ≤0.5[2] | ≤0.2[1] 0[2] |
| | QPSK | | ≤1 | 0 |
| | 16 QAM | | ≤2 | ≤1 |
| | 64 QAM | | ≤2.5 | |
| | 256 QAM | | ≤4.5 | |

TABLE 1-continued

| | | MPR (dB) | | |
|---|---|---|---|---|
| Modulation | | Edge RB allocations | Outer RB allocations | Inner RB allocations |
| CP-OFDM | QPSK | ≤3 | | ≤1.5 |
| | 16 QAM | ≤3 | | ≤2 |
| | 64 QAM | | ≤3.5 | |
| | 256 QAM | | ≤6.5 | |

NOTE 1:
Applicable for UE operating in TDD mode with Pi/2 BPSK modulation and UE indicates support for UE capability powerBoosting-pi2BPSK and if the IE powerBoostPi2BPSK is set to 1 and 40% or less slots in radio frame are used for UL transmission for bands n40, n41, n77, n78 and n79. The reference power of 0 dB MPR is 26 dBm.

NOTE 2:
Applicable for UE operating in FDD mode, or in TDD mode in bands other than n40, n41, n77, n78 and n79 with Pi/2 BPSK modulation and if the IE powerBoostPi2BPSK is set to 0 and if more than 40% of slots in radio frame are used for UL transmission for bands n40, n41, n77, n78 and n79.

With the use of pi/2 BPSK and power boosting, the UE's uplink coverage may be further improved over quadrature phase shift keying (QPSK), which is the lowest 3GPP mandatory (i.e., not an optional feature) modulation order in the uplink, for example. This pi/2 BPSK related improvement may be due to the simpler modulation that is easier to demodulate correctly (albeit the bit-rate per symbol is halved with pi/2 BPSK when compared to QPSK), and the increased transmit power. The use of pi/2 BPSK and power boosting for uplink coverage enhancement may be especially useful for large cell deployments, such as large cell rural deployments, where a UE is at the edge of that cell.

In 3GPP Release-15 (Rel-15), the demodulation reference signal (DMRS) symbols (which are generated based on the Zadoff-Chu sequence) may provide poor peak-to-average power ratio performance, when compared to pi/2-BPSK modulated data symbols. This may lead to larger maximum power reduction and lower achievable transmit power on average than what the data symbols would require. In 3GPP Release-16 (Rel-16), the pi/2-BPSK modulated DMRS may be used with pi/2-BPSK modulated physical uplink shared channel (PUSCH). As this new DMRS design is a pseudo-random sequence modulated by pi/2-BPSK, the peak-to-average power ratio performance may be similar to data symbols performance. Thus, the overall performance improvement on the MPR requirements may be realized. For example, the pi/2-BPSK DMRS may provide an MPR improvement (e.g., smaller MPR) of 2-3 dB compared to Rel-15 DMRS.

The UE's initial access procedure (also referred to as the random access channel, or RACH, procedure) to a network is used for connection setup, for example. FIG. 1A depicts an example of an RACH procedure for an initial access by a UE 110 of the network including a base station (e.g., 5G gNB type base station 150).

For the UE 110, the initial network access procedure involves a random access channel (RACH) transmission (see, e.g., Msg 1, physical random access channel (PRACH) preamble at 102) followed by a first uplink message (Msg3, radio resource control (RRC) connection request) transmission, at 106, on a physical uplink shared channel (PUSCH). This uplink transmission on the PUSCH is scheduled with the uplink grant provided, at 104, in a random access response message (Msg2) provided by the network, such as a base station 150. The Msg 2 uplink grant (which is provided for the initial access) includes the modulation and coding scheme (MCS) and PUSCH resource location for the UE's Msg 3 transmission. And, the base station may respond at 108 with a fourth message, Msg 4 with an RRC-connection set-up including a contention resolution identifier. The procedure at FIG. 1A, however, may not enable the UE's initial access transmission at Msg 3 to be pi/2-BPSK as pi/2-BPSK is an optional UE capability, and the network or base station may not be aware of whether the UE is capable of this feature during the initial access.

In some example embodiments, there is provided a way to indicate the pi/2-BPSK PUSCH support prior to initial access at Msg 3.

In some example embodiments, there is provided a pi/2-BPSK DMRS for PUSCH transmission during a UE's initial access, such as the Msg 3 RRC connection request to the network.

In some example embodiments, network signaling may be used to allow the UE to use the pi/2-BPSK modulation and coding scheme for the Msg 3 transmission on the PUSCH and/or use a pi/2-BPSK modulation for the DMRS sequence also sent on the PUSCH. As noted, the use of use the pi/2-BPSK MCS for the Msg 3 transmission and/or the pi/2-BPSK DMRS may improve the coverage performance of UE's initial access procedure, such as in the case of a cell-edge UE in, for example, a large cell deployment.

With the use of the pi/2-BPSK DMRS sequence, the DMRS sequence for pi/2-BPSK will be different, and as such detectable, from other modulation and coding schemes. In other words, the sequence (e.g., code) used for pi/2-BPSK DMRS will be a different sequence when compared to the code used for QPSK DMRS. Thus, the network, such as a network node (e.g., a base station), can detect the DMRS sequence for pi/2-BPSK. The network node may also differentiate the transmission type based on two different DMRS sequences of same type, such as between two different pi/2 BPSK DMRS sequences or two different Zadoff-Chu (ZC) DMRS sequences.

In some example embodiments, the network and, in particular, the base station may detect the difference between a pi/2-BPSK MCS transmission and a QPSK MCS transmission based on a correlation of the received DMRS against two types of DMRS. For example, the base station may correlate against the sequence for the pi/2-BPSK DMRS used with one MCS using pi/2 BPSK modulation for data transmission and against the sequence for the ZC DMRS used with another MCS using QPSK modulation for data transmission on the PUSCH to detect which of the two sequences DMRS is present and from there determine which of the two MCS (e.g., pi/2 BPSK or QPSK) is used for data transmission on PUSCH. Alternatively, or additionally, the base station may detect an attempt to demodulate by first assuming one of the two transmission modes of the DMRS and the PUSCH, and if the PUSCH CRC fails, the base stations tries again assuming the UE used the other transmission mode.

Figure 1B:
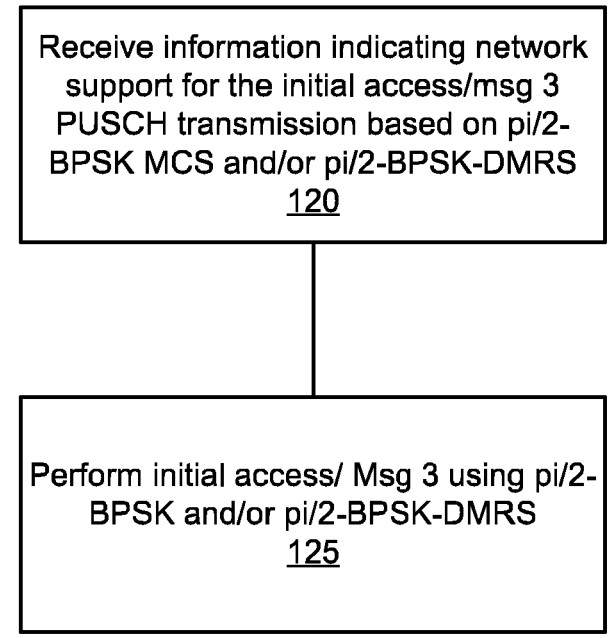
FIG. 1B depicts an example of a process at a user equipment for accessing a network using pi/2-BPSK and pi/2-BPSK-DMRS, in accordance with some example embodiments.

FIG. 1B depicts an example of an initial network access process at the UE, in accordance with some example embodiments. The description of FIG. 1B also refers to FIG. 1A.

At 120, the UE 110 may receive information indicating that the network supports an initial UE access based on pi/2-BPSK MCS and pi/2-BPSK-DMRS. For example, the UE may receive from the base station 150 information indicating that (1) the initial access, such as the Msg 3 transmitted via the PUSCH at 106, may be configured with a pi/2-BPSK modulation and coding scheme and/or that (2) a pseudo-random pi/2-BPSK-modulated bit sequence may be used as the DMRS sequence for the Msg 3 PUSCH demodulation. For example, the PUSCH data symbols may be pi/2 BPSK modulated, while the DMRS sequence may be of a particular type indicative of the pi/2 BPSK. For example, the DMRS may be a pseudo-random bit-sequence indicative of the pi/2 BPSK, although the DMRS may also be a ZC sequence (but in either case the sequence indicates pi/2 BPSK rather than QPSK). As noted, the base station receiver uses the DMRS sequence (which is known) to estimate the UE's radio channel and demodulate the PUSCH data symbols.

The noted information (which may be received at 120) indicative of support for pi/2 BPSK by the network may be sent to the UE in a variety of ways.

In some embodiments, the information indicative of support for pi/2 BPSK may be broadcast channel to the UE as part of system information sent to the UE prior to the Msg 1 being sent. For example, the base station may transmit system information indicative of support for pi/2 BPSK as a broadcast on a downlink before the Msg 1 preamble is sent at 102.

In some embodiments, the information indicative of support for pi/2 BPSK may be sent via the RAR of Msg 2 at 104. For example, the network may control pi/2 access in a more dynamic manner by including information indicative of network support for pi/2 BPSK in the RAR (e.g., Msg 2) to enable the UE (if it supports pi/2 BPSK) to proceed with the initial access at Msg 3, for example. In the case of the RAR being used to carry the pi/2 BPSK indication, the system information broadcast (which is transmitted prior to the Msg 1 being sent) may include the pi/2 BPSK support indication as well.

To illustrate further, the random access response 104 from the base station 150 may include an indication that the network supports an initial UE access based on the pi/2-BPSK MCS and/or the pi/2-BPSK-DMRS. This indication may be in the form of an uplink grant (which is provided in Msg 2) that indicates pi/2-BPSK MCS and/or pi/2-BPSK-DMRS can be used for the initial access by the UE at Msg 3.

In some example embodiments, the gNB 150 may also indicate to the UE a range of initial MCS values applicable for pi/2-BPSK transmission. For example, the information received by the UE 110 at 120 may indicate a list of MCS values (or indexes for those values) for which the pi/2-BPSK MCS transmission is applicable. This may be in the form of an MCS index, an example of which is shown below at Tables 3 and 4.

At 125, the UE may perform an initial network access to the network using pi/2-BPSK MCS and/or pi/2-BPSK-DMRS. In response to receiving an uplink grant as noted at 120, the UE may perform the initial access by transmitting, over the PUSCH to the base station 150, the RRC connection request (e.g., Msg 3 having the pi/2-BPSK MCS) and the pi/2-BPSK-DMRS.

Figure 1C:
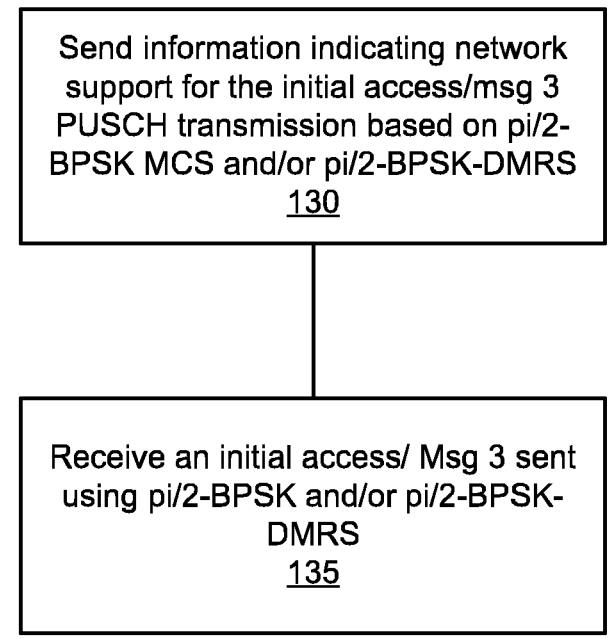
FIG. 1C depicts an example of a process at a base station for enabling accessing using pi/2-BPSK and pi/2-BPSK-DMRS, in accordance with some example embodiments.

FIG. 1C depicts an example of an initial network access process at the base station, in accordance with some example embodiments. The description of FIG. 1B also refers to FIG. 1A.

At 130, the network such as base station 150 may send to the UE 110 information including an indication that the network supports an initial UE access based on pi/2-BPSK MCS and pi/2-BPSK-DMRS. As noted, the base station 150 may send this indication in a variety of ways, such as via system information sent to the UE prior to the Msg 1 being sent and/or via the RAR of Msg 2 at 104. In some example embodiments, the information sent at 130 may indicate a list of MCS values for which the pi/2-BPSK MCS transmission is applicable. This may be in the form of an MCS index, an example of which is shown below at Tables 3 and 4.

At 135, the base station 150 may receive from the UE 110 an initial access message sent using pi/2-BPSK MCS and/or pi/2-BPSK-DMRS. For example, the base station 150 may receive, via the PUSCH, Msg 3 sent using pi/2-BPSK MCS and the pi/2-BPSK-DMRS. The base station 150 may detect that the UE used pi/2-BPSK as the pi/2-BPSK-DMRS can be detected as different from QPSK DMRS.

In some example embodiments, the UE supporting pi/2-BPSK and pi/2-BPSK-DMRS may transmit Msg3 using pi/2-BPSK if the uplink grant provided in random access response (e.g., RAR at Msg 2) indicates a specific MCS (e.g., an MCS reserved or designated for this purpose). The RAR (which includes an uplink grant for the UE's Msg3 transmission) also includes the MCS to be used by UE. For example, the UE may use the MCS as pi/2-BPSK when a subset of MCS (which may be indicated by system information) is sent in the uplink grant.

With possible support of pi/2-BPSK transmission for initial access, the UE may also use power-boosted transmission for that initial access if required. The power boosting operation for initial access may be controlled and configured by the network to avoid an autonomous increase in UE transmission power for initial access, which may lead to increased inter-cell interference. As noted, the base station 150 may send this power boosting indication in a variety of ways, such as via system information sent to the UE via the RAR of Msg 2 at 104 and the like.

With respect to enabling power boosting for pi/2-BPSK transmission for initial access, the network may send to the UE an indication of whether the UE can use power boosted transmission for RACH access or not. Alternatively, or additionally, the network may send to the UE an indication that the UE can consider power boosting only for RACH retransmissions and not for initial transmissions. Alternatively, or additionally, the network may send to the UE an indication of whether hybrid automatic repeat request (HARQ) retransmission over the PUSCH can be sent with increased power using power boosting or not. Alternatively, or additionally, the network may send to the UE an indication of which of the MCS indexes are eligible for pi/2 BPSK transmissions. As noted, the base station 150 may send this power boosting indication in a variety of ways, such as via system information sent to the UE via the RAR of Msg 2 at 104 and the like. As noted, these indications may be provided to the UE by the network or base station in a variety of ways, such as provided to the UE via the random access response (e.g., Msg 2 at 104), included in system information sent to the UE prior to the Msg 1, carried by the physical downlink shared channel (PDSCH), physical broadcast channel (PBCH), or other type of downlink.

Referring again to FIG. 1A, the uplink grant information included in the Msg 2 random access response (RAR) may include one or more of the fields depicted below at Table 2 (which is reproduced from 3GPP TS 38.213). Referring to Table 2, 4 bits are reserved for indicating the MCS to be used for Msg 3.

TABLE 2

Random Access Response Grant Content field size [TS38.213]

| RAR grant field | Number of bits |
|---|---|
| Frequency hopping flag | 1 |
| PUSCH frequency resource allocation | 14 |
| PUSCH time resource allocation | 4 |

TABLE 2-continued

Random Access Response Grant Content field size [TS38.213]

| RAR grant field | Number of bits |
|---|---|
| MCS | 4 |
| TPC command for PUSCH | 3 |
| CSI request | 1 |

If the PRACH preamble is used to detect the UE's ability to use pi/2 BPSK, the currently reserved MCS values (see table 3 and 4 below which are reproduced from TS 38.214) may be used to schedule Pi/2 BPSK, in accordance with some example embodiments. If a separate preamble is used by the UE capable of pi/2-BPSK, the network will know the pi/2-BPSK capability based on the preamble itself. In this case, when the highlighted entries in the MCS indexes are sent in Msg 2, the UE may use pi/2-BPSK. Here, the UE need not signal its capability. Sending the preamble (which is reserved for this type of pi/2 BPSK UE) is an indication to the network that UE is capable of pi/2-BPSK MCS. Depending on the UE type determined by the Msg 3 DMRS type, the set of lowest MCS values may result in the UE being granted at 104 an uplink access grant with a QPSK transmission or pi/2 BPSK transmission (with or without power boosting). If tp-pi2BPSK is configured, q=1 (e.g., pi/2 BPSK is used); otherwise q=2 (e.g., QPSK is used)) with the default in Table 3 in the modulation order and code rate determination when the MCS index is 0 or 1. For other MCS indexes, operations may remain unchanged. The network may also configure usage of the other MCS table for even lower data rates (and larger coverage) where the lowest 6 MCSs may use pi/2 BPSK. Further, the network may also configure which MCSs are eligible for pi/2-BPSK in the system information.

TABLE 3

Table 6.1.4.1-1: MCS index table for PUSCH with transform precoding and 64QAM [TS38.214 at Table 6.1.4.1-1]

| MCS Index $I_{MCS}$ | Modulation Order $Q_m$ | Target code Rate R × 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |

TABLE 3-continued

Table 6.1.4.1-1: MCS index table for PUSCH with transform precoding and 64QAM [TS38.214 at Table 6.1.4.1-1]

| MCS Index $I_{MCS}$ | Modulation Order $Q_m$ | Target code Rate R × 1024 | Spectral efficiency |
|---|---|---|---|
| 28 | q | reserved | |
| 29 | 2 | reserved | |
| 30 | 4 | reserved | |
| 31 | 6 | reserved | |

TABLE 4

MCS index table for PUSCH with transform precoding and 64QAM [TS38.214 at Table 6.1.4.1-2:]

| MCS Index $I_{MCS}$ | Modulation Order $Q_m$ | Target code Rate R × 1024 | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | reserved | |
| 29 | 2 | reserved | |
| 30 | 4 | reserved | |
| 31 | 6 | reserved | |

Figure 2A:
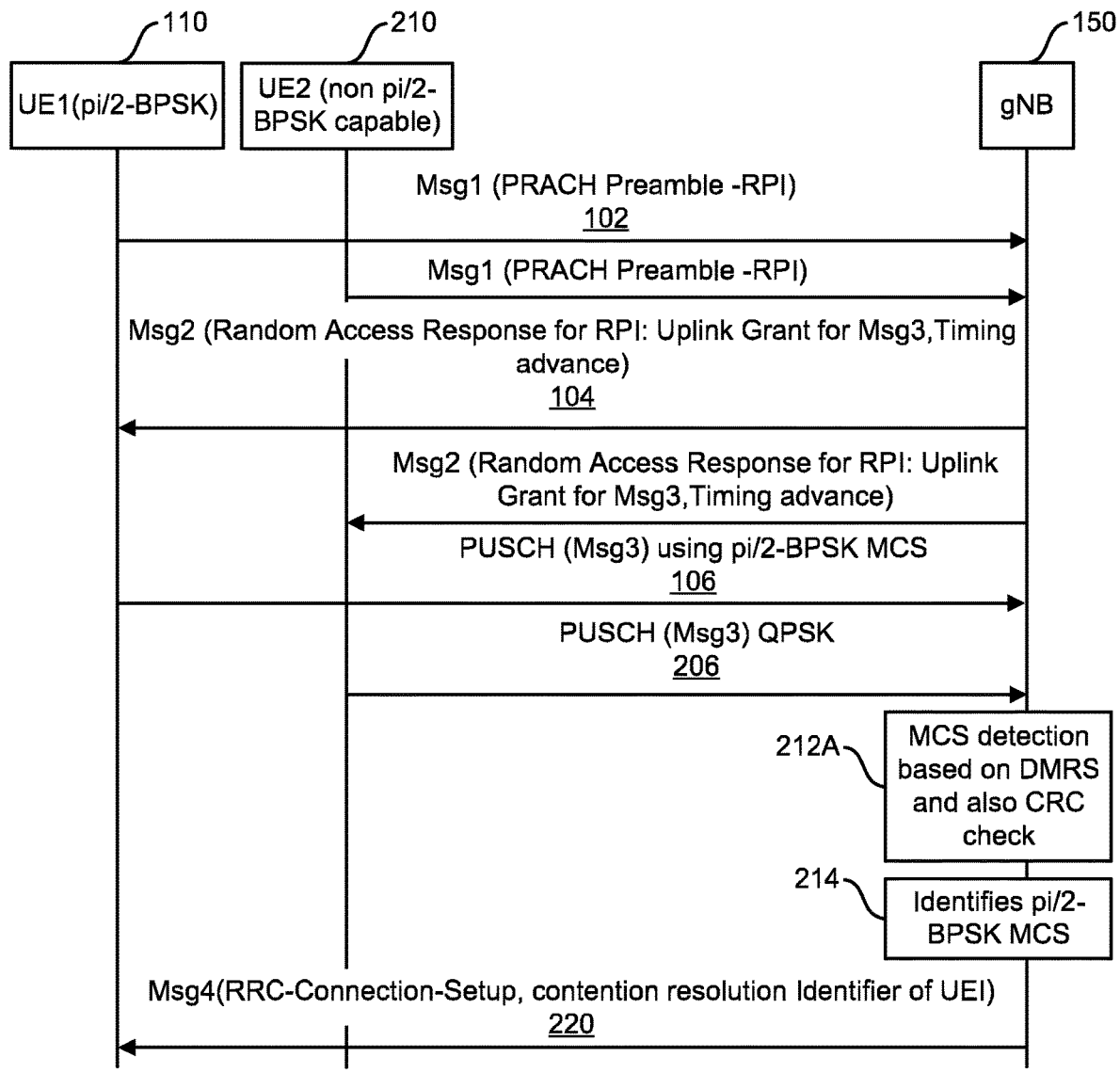
FIG. 2A depicts an example of an initial access in which one of the UEs supports using pi/2-BPSK while another UE 210 does not support using pi/2-BPSK, in accordance with some example embodiments.

FIG. 2A depicts an example of an initial network access in which one of the UEs 110 supports (e.g., is able to be configured with) pi/2-BPSK MCS and pi/2-BPSK DMRS for PUSCH while another UE 210 does not support pi/2-BPSK MCS and pi/2-BPSK DMRS. As there is another UE 210 which may receive the same uplink grant as UE 110 on the PUSCH for contention-based RACH access, the gNB 150 may receive, at 106, (1) a Msg 3 106 from pi/2-BPSK UE 110 sent with pi/2-BPSK MCS including pi/2-BPSK DMRS and also receive, at 206, (2) another Msg 3 from UE 210 using QPSK (which corresponds to the actual MCS index interpretation of the MCS table). For example, the UE 110 may receive an uplink grant including an MCS index 0 (see e.g., Table 3), and UE 210 may receive an uplink grant including an MCS index 0 (see e.g., Table 3) since both pi/2 BPSK and QPSK share the same indexes. However, the UE 110 (which supports pi/2 BPSK) will send Msg 3 based on the MCS 0 index as pi/2 BPSK MCS while the UE 210 (which does not support pi/2 BPSK but instead uses QPSK) will send Msg 3 based on the MCS 0 index as QPSK MCS. Due to the shared MCS indexes, the base station may need to detect whether pi/2-BPSK is used by UE or not.

At 212A, the gNB 150 may disambiguate between QPSK and pi/2-BPSK based on the received DMRS and/or on a CRC check (e.g., decoding using different MCS) to enable identification, at 214, of the MCS as pi/2-BPSK. For example, the gNB may perform a (1) correlation of received DMRS against the two types of DMRS for pi/2-BPSK and for QPSK or (2) attempt to demodulate first assuming one of the two transmission modes, and if the PUSCH CRC fails, trying again assuming the UE used the other transmission mode. In this way, the gNB can detect the pi/2-BPSK. At 220, the gNB responds with Msg 4 with the RRC connection setup information to UE 110 (which is the pi/2-BPSK capable UE).

Figure 2B:
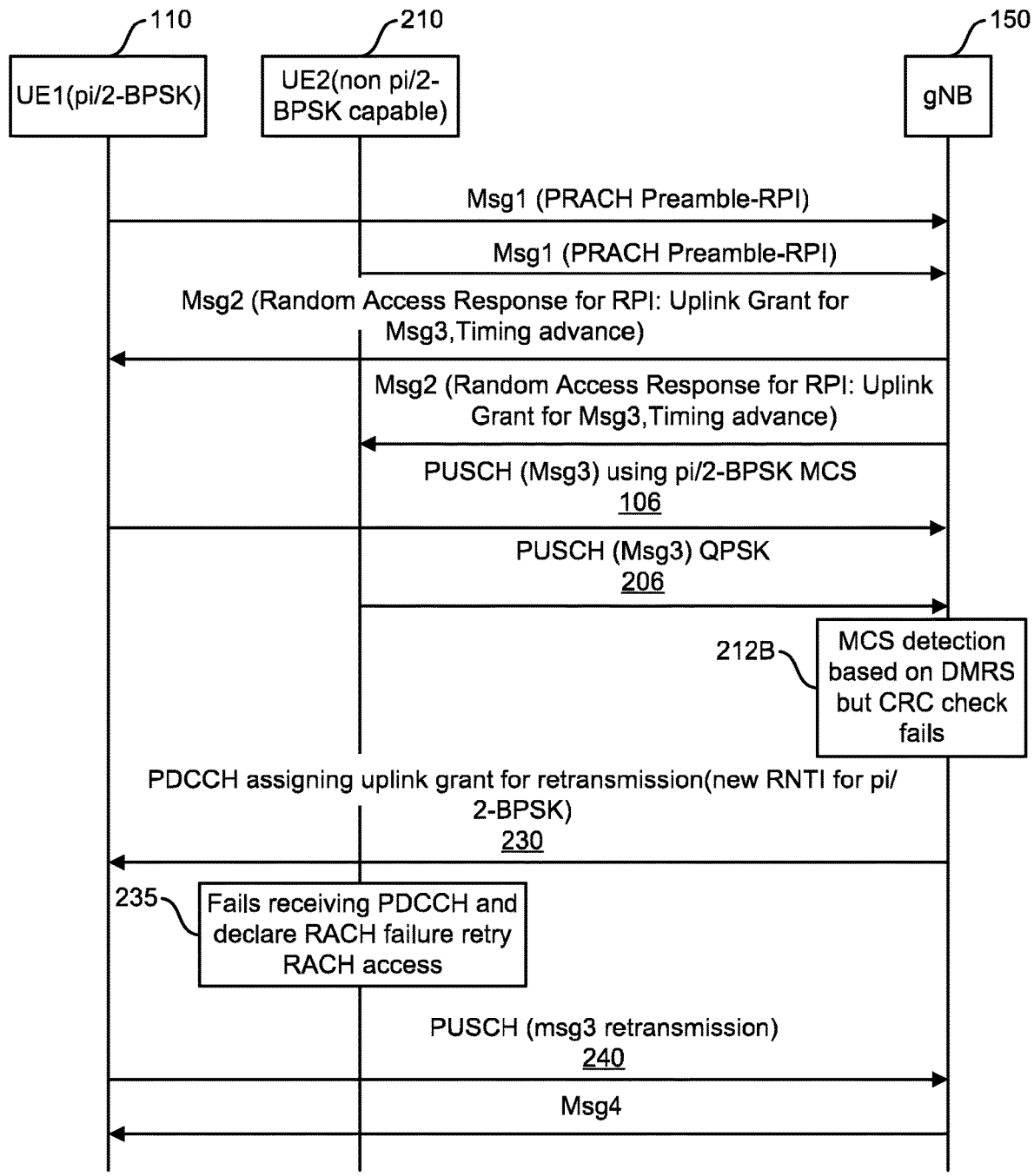
FIG. 2B depicts another example of an initial access in which one of the UEs supports using pi/2-BPSK while another UE does not support using pi/2-BPSK, in accordance with some example embodiments.

FIG. 2B is similar to FIG. 2A but at 212B, the gNB 150 attempts to identify that the transmission is for pi/2-BPSK based on the DMRS but the CRC check fails. Here, the gNB first detects the pi/2-BPSK based on the DMRS. If the detection is with high confidence based on DMRS sequence correlation but the CRC check fails on the received packet, there will be retransmission request sent at 230. This retransmission request can be sent using different radio network temporary identifier (RNTI). With this, only the pi/2-BPSK UE 110 will receive grant for retransmission, thus avoiding the other UE 210 colliding for retransmission. For example, the gNB may, at 230, send, via the physical downlink control channel (PDCCH), to the UE 110 an assignment of an uplink grant including the downlink control information (DCI) format for retransmission using a new, different RNTI for pi/2-BPSK. The UE 110 can re-transmit at 240. Here, the collision of UEs 110 and 210 at retransmission is avoided as the UE 210 (using the other, QPSK MCS) will check for the temp C-RNTI for receiving the further DCI for retransmission. The other UE 210 (which contents for RACH access) will declare a failure at 235 before receiving Msg 4 and retry RACH access. For pi/2-BPSK, the UE collision from other UE is avoided for retransmission.

The network including the base station may indicate via system information that set of MCS reserved for pi/2-BPSK should not be used by other UE. When this information is received by UE not supporting pi/2-BPSK, these UE should avoid transmitting message-3, when the uplink grant contains the MCS set assigned for pi/2-BPSK. This avoids collision of same uplink grant used by both pi/2-BPSK and other UE. In this case, only legacy UE which does not support the new parameter of system information only will attempt to use the MCS. Here the collision can be avoided by controlling other UE not to use the selected MCS.

As noted, the network including the base station may also indicate and/or control the power boosting for pi/2-BPSK transmission which indicates use of power boosting for initial or retransmission or RACH retries. With this indication, the power boosting feature usage of pi/2-BPSK also can be controlled depending on the network interference situation.

Figure 3:
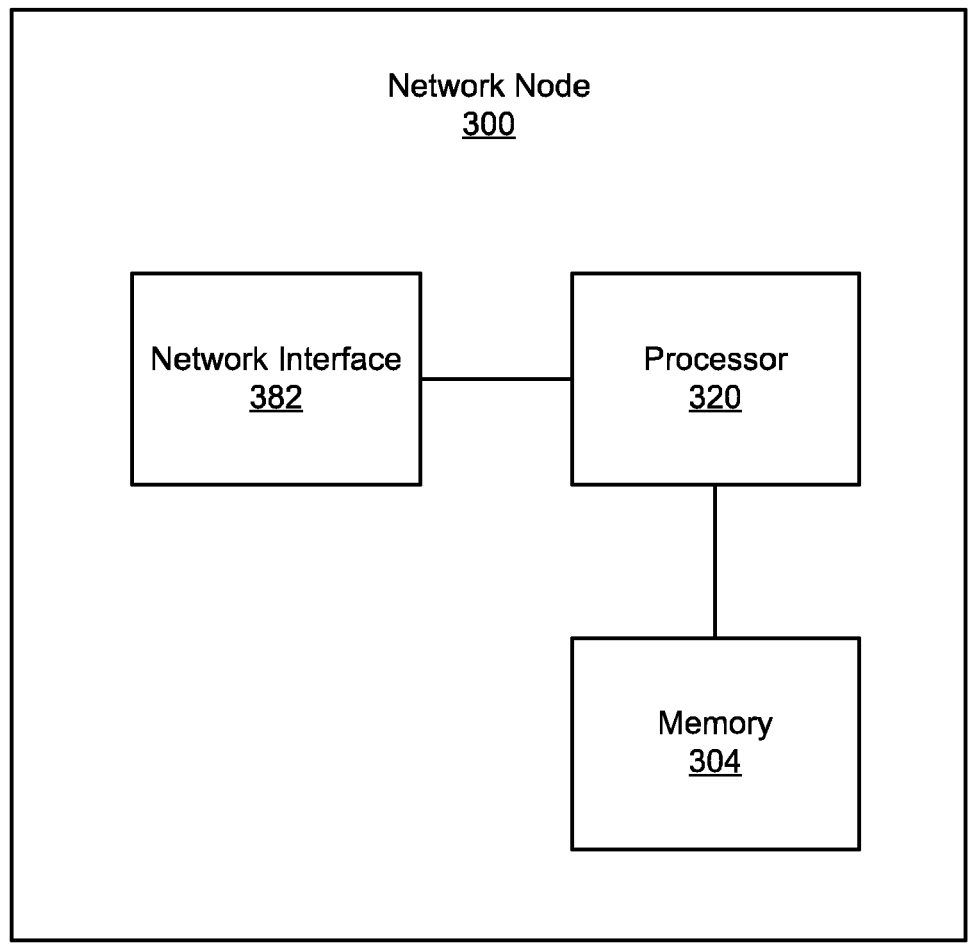
FIG. 3 depicts an example of a network node, in accordance with some example embodiments.

FIG. 3 depicts a block diagram of a network node 300, in accordance with some example embodiments. The network node 300 may be configured to provide one or more network side functions, such as a base station. The network node 300 may include a network interface 302, a processor 320, and a memory 304, in accordance with some example embodiments. The network interface 302 may include wireless transceivers to enable access to UEs being served. These wireless transceivers may be compatible and thus similar to the wireless transceivers noted below for the UEs. The network interface may also include wired and/or wireless interfaces to other nodes including other base stations, the Internet, and/or other nodes and network functions. The memory 304 may comprise volatile and/or non-volatile memory including program code, which when executed by at least one processor 320 provides, among other things, the processes disclosed herein with respect to the base station. In some embodiments, the network node may comprise or be comprised in a base station configured to send, to a user equipment, information indicating network support of an initial network access based on a pi/2 binary phase shift keying (pi/2-BPSK) modulation and coding scheme; receive, via a physical uplink shared channel, the initial network access comprising a connection request from the user equipment; and detect the connection request is transmitted using the pi/2-BPSK modulation and coding.

Figure 4:
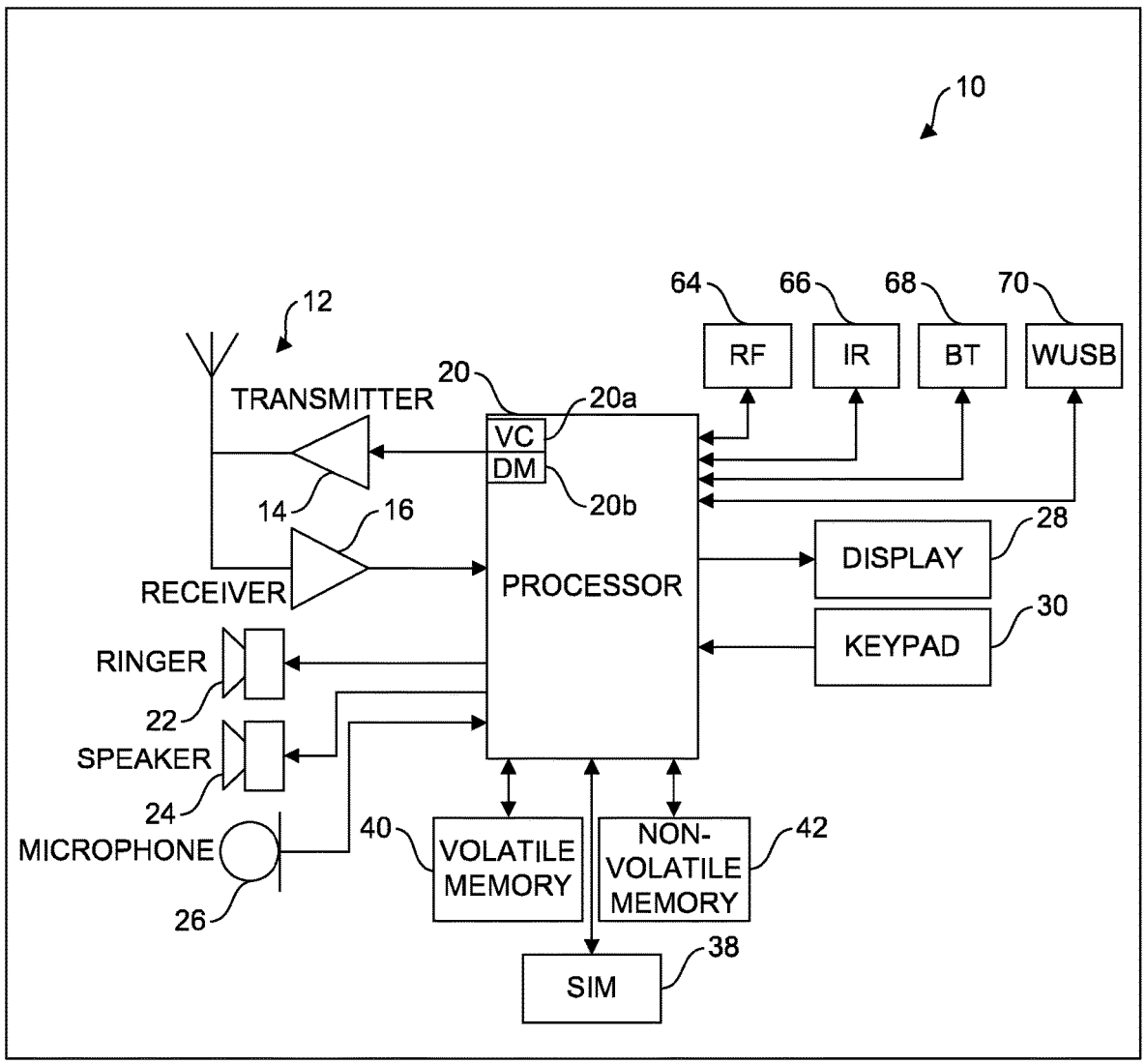
FIG. 4 depicts an example of an apparatus, in accordance with some example embodiments.

FIG. 4 illustrates a block diagram of an apparatus 10, in accordance with some example embodiments. The apparatus may comprise or be comprised in a user equipment, such as user equipment 110, 210, and the like.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 4, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein with respect to the UE.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the UE.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 4, computer-readable medium may comprise a non-transitory computer-readable storage medium that may be any media that can contain or store the instructions for use by or in connection with an instruction execution system, apparatus, or device, such as a computer.

In some embodiments, the apparatus may comprise or be comprised in a user equipment configured to at least In some example embodiments, there may be provided a method that includes receive information indicating network support of an initial network access based on a pi/2 binary phase shift keying (pi/2-BPSK) modulation and coding scheme; and perform, in response to the received system information, the initial network access by at least sending a connection request based on the pi/2-BPSK modulation and coding scheme.

Without in any way limiting the scope, interpretation, or application of the claims appearing below, a technical effect of one or more of the example embodiments disclosed herein may include enhanced initial network access for a UE.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. An apparatus comprising:
   at least one processor; and
   at least one memory including computer program code, the at least one memory and the computer program code configured to, with the at least one processor, cause the apparatus to at least:
   receive information indicating network support of an initial network access based on a pi/2 binary phase shift keying (pi/2-BPSK) modulation and coding scheme; and
   perform, in response to the received system information, the initial network access by at least sending a connection request based on the pi/2-BPSK modulation and coding scheme,
   wherein the received information further indicates one or more of the following: whether power boosting is used for performing a random access channel access using the pi/2-BPSK modulation and coding scheme and/or the pi/2-BPSK demodulation reference signal; whether power boosting is used for the initial network access or a re-transmission; whether power boosting is used for hybrid automatic repeat request retransmission; or one or more modulation and coding scheme indexes eligible for pi/2 BPSK transmission.

2. The apparatus of claim 1, wherein the information is received as system information transmitted before a physical random access channel (PRACH) preamble is sent by the user equipment.

3. The apparatus of claim 1, wherein the information is received from the network as a random access response including an uplink grant from a base station.

4. The apparatus of claim 1, wherein the received information further indicates network support for a pi/2-BPSK demodulation reference signal.

5. The apparatus of claim 1, wherein the connection request comprises a radio resource control connection request message sent, via a physical uplink shared channel, based on the pi/2-BPSK modulation and coding scheme and a demodulation reference signal.

6. The apparatus of claim 5, wherein the demodulation reference signal comprises a pi/2-BPSK demodulation reference or a Zadoff-Chu DMRS demodulation reference signal.

7. The apparatus of claim 1, wherein the apparatus is further caused to at least send a physical random access channel (PRACH) preamble indicative of the user equipment support of the pi/2-BPSK modulation and coding scheme and/or a pi/2-BPSK demodulation reference signal.

8. An apparatus comprising:
   at least one processor; and
   at least one memory including computer program code, the at least one memory and the computer program code configured to, with the at least one processor, cause the apparatus to at least:
   send, to a user equipment, information indicating network support of an initial network access based on a pi/2 binary phase shift keying (pi/2-BPSK) modulation and coding scheme;
   receive, via a physical uplink shared channel, the initial network access comprising a connection request from the user equipment; and
   detect the connection request is transmitted using the pi/2-BPSK modulation and coding,
   wherein the information that is sent further indicates one or more of the following: whether power boosting is used for performing a random access channel access using the pi/2-BPSK modulation and coding scheme and/or the pi/2-BPSK demodulation reference signal; whether power boosting is used for the initial network access or a re-transmission; whether power boosting is used for hybrid automatic repeat request retransmission; or one or more modulation and coding scheme indexes eligible for pi/2 BPSK transmission.

9. The apparatus of claim 8, wherein the apparatus is further caused to at least respond to the connection request with connection set up information, in response to the detecting.

10. The apparatus of claim 8, wherein the information is sent as at least one of the following: system information transmitted before a physical random access channel (PRACH) preamble is sent by the user equipment or a random access response including an uplink grant from the base station.

11. The apparatus of claim 8, wherein the connection request comprises a radio resource control connection request message carried, via a physical uplink shared channel, using the pi/2-BPSK modulation and coding scheme and a demodulation reference signal.

12. The apparatus of claim 11, wherein the demodulation reference signal comprises a pi/2-BPSK demodulation reference signal or a Zadoff-Chu DMRS demodulation reference signal sequence.

13. The apparatus of claim 8, wherein information indicating the network support further indicates support for the pi/2-BPSK demodulation reference signal.

14. The apparatus of claim 8, wherein the apparatus is further caused to at least receive a physical random access channel (PRACH) preamble indicative of the user equipment support of the pi/2-BPSK modulation and coding scheme and/or the pi/2-BPSK demodulation reference signal.

15. The apparatus of claim 8, wherein the detect further includes detecting the connection request is transmitted using a pi/2-BPSK modulation and coding scheme based on at least one of a correlation a demodulation reference signal sequence indicative of the pi/2-BPSK modulation and coding scheme or a cyclic redundancy check of the demodulation reference signal sequence.

16. The apparatus of claim 15, wherein in response to a failure of the cyclic redundancy check, sending to the user equipment, an assignment of an uplink grant including a downlink control information format for a retransmission using a new radio network temporary identifier for a pi/2-BPSK based retransmission.

17. A non-transitory computer-readable storage medium including computer program code which when executed by at least one processor cause a user equipment to perform operations, comprising:
receiving information indicating network support of an initial network access based on a pi/2 binary phase shift keying (pi/2-BPSK) modulation and coding scheme; and
performing, in response to the received system information, the initial network access by at least sending a connection request based on the pi/2-BPSK modulation and coding scheme,
wherein the received information further indicates one or more of the following: whether power boosting is used for performing a random access channel access using the pi/2-BPSK modulation and coding scheme and/or the pi/2-BPSK demodulation reference signal; whether power boosting is used for the initial network access or a re-transmission; whether power boosting is used for hybrid automatic repeat request retransmission; or one or more modulation and coding scheme indexes eligible for pi/2 BPSK transmission.

18. A non-transitory computer-readable storage medium including computer program code which when executed by at least one processor cause a network node to perform operations, comprising:
sending, to a user equipment, information indicating network support of an initial network access based on a pi/2 binary phase shift keying (pi/2-BPSK) modulation and coding scheme;
receiving, via a physical uplink shared channel, the initial network access comprising a connection request from the user equipment; and
detecting the connection request is transmitted using the pi/2-BPSK modulation and coding,
wherein the information that is sent further indicates one or more of the following: whether power boosting is used for performing a random access channel access using the pi/2-BPSK modulation and coding scheme and/or the pi/2-BPSK demodulation reference signal; whether power boosting is used for the initial network access or a re-transmission; whether power boosting is used for hybrid automatic repeat request retransmission; or one or more modulation and coding scheme indexes eligible for pi/2 BPSK transmission.

* * * * *